Sept. 5, 1933.    W. O. TWOMBLY    1,925,351
TEMPERATURE CONTROL SYSTEM FOR AUTOMOTIVE ENGINES
Filed May 17, 1932    3 Sheets-Sheet 1

Inventor
Willard O. Twombly
by Townsend F. Beaman
Attorney

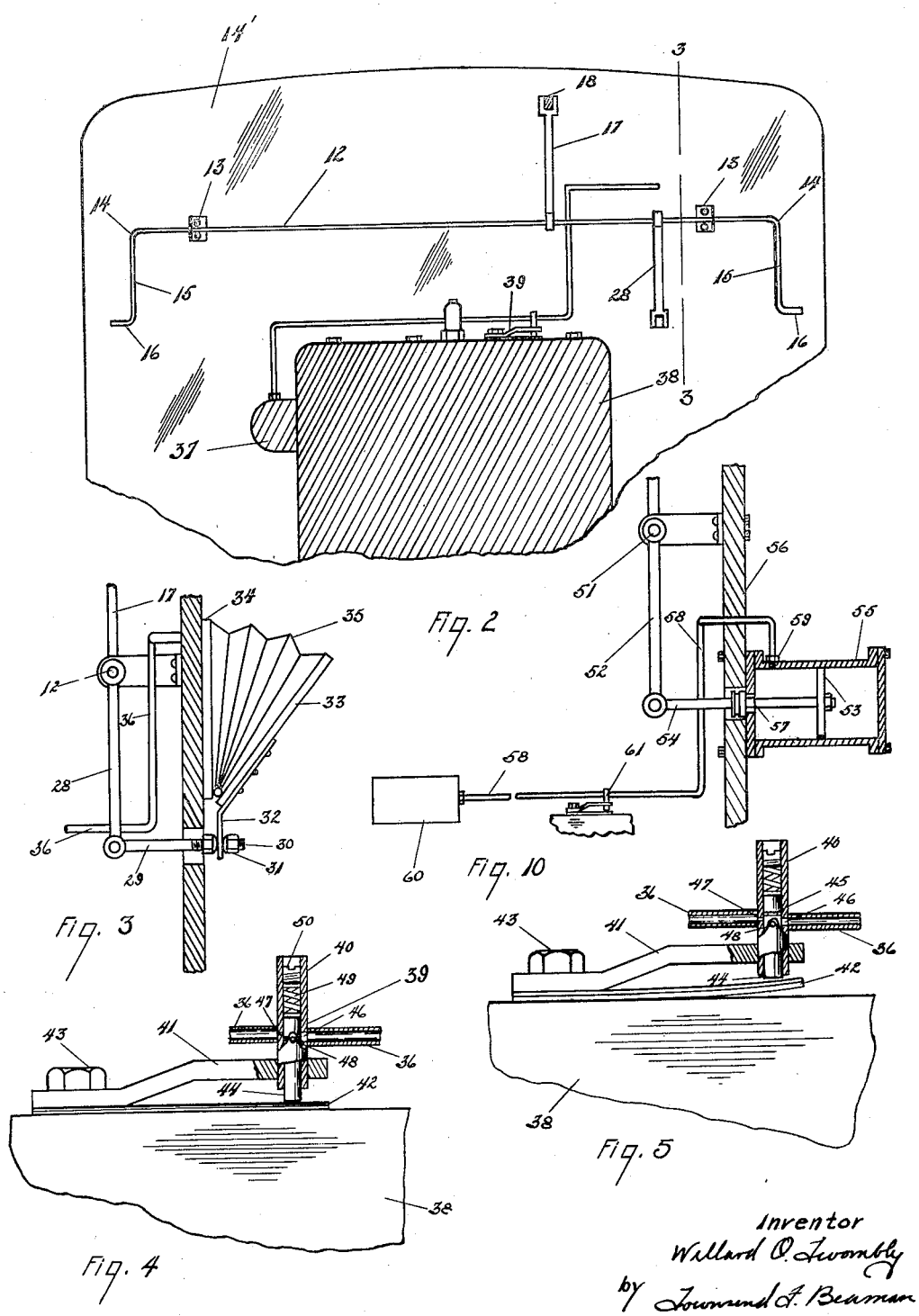

Sept. 5, 1933.   W. O. TWOMBLY   1,925,351
TEMPERATURE CONTROL SYSTEM FOR AUTOMOTIVE ENGINES
Filed May 17, 1932   3 Sheets-Sheet 3

Inventor
Willard O. Twombly
by Townsend & Beaman
Attorney

Patented Sept. 5, 1933

1,925,351

UNITED STATES PATENT OFFICE 1,925,351

TEMPERATURE CONTROL SYSTEM FOR AUTOMOTIVE ENGINES

Willard O. Twombly, Jackson, Mich., assignor to C T Electric Company, Jackson, Mich., a corporation of Michigan Application May 17, 1932. Serial No. 611,860

33 Claims. (Cl. 123—174)

This invention relates to an improvement in a temperature control system for internal combustion engines of the type which are substantially encased in a housing or hood during operation.

It is well recognized that the efficiency of an internal combustion engine is greatly affected by variation in climatic temperature. The present day high compression automotive engine operates at its point of highest efficiency in the neighborhood of 170° F.; any substantial increase or decrease in temperature resulting in a decided decrease in efficiency.

Herebefore attempts have been made to regulate the temperature at which an engine is operating within an encasement by regulating the amount of air employed to remove the heat from the cooling medium circulated through the engine in accordance with the increase or decrease of temperature of the cooling medium as is shown by Snell patent, No. 1,310,898. This type of engine temperature control system is too elastic and dependent upon climatic temperature to maintain the engine at substantially a constant temperature for the reason that the temperature of the cooling medium in the radiator and in the circulation system of the engine is always below the temperature of the engine block. The amount of lag in temperature between the cooling medium in the radiator and the engine block varies depending upon rapidity of changing climatic temperature and rate of flow of cooling medium through the engine block and radiator. It is only under constant climatic temperature and constant rate of cooling air flow that substantially constant engine block temperature can be maintained in this type of system.

Also attempts have been made to develop a satisfactory fluid operated mechanism thermostatically controlled for opening and closing the shutters of an automotive engine wherein pressure or vacuum created by the engine is employed as the operating medium, as is shown in the patent to Rumens, No. 1,390,724, granted September 13, 1921. However, this type of mechanism only partly performs the necessary temperature control required of it for the reason that the entire system is dependent upon the running of the engine and thus does not have a full thermostatic control.

It is a primary object of the present invention to regulate the flow of cooling air through the encasement of an internal combustion engine in a manner which will permit the engine block temperature to be maintained at substantially a constant temperature regardless of climatic temperatures and will take into consideration all contingencies which may occur in the operation of the engine.

It is a further purpose of the invention to provide novel means by which the radiator shutters and louvers of a motor vehicle may be automatically operated by a motor under the control of a thermostat attached directly to the engine head.

It is a still further purpose of this invention to provide a thermostatic control means which will permit the shutters and louvers of a motor vehicle to be opened by fluid pressure and to remain open or to close, independent of the opening source, under the control of the temperature of the engine block.

Other objects and advantages of this invention will appear as the description of the invention proceeds. It is to be distinctly understood, however, that it is not intended to limit this invention to the exact details shown or described, but that it is intended to include as part of this invention, all such obvious changes and modifications of parts as would occur to those skilled in this art and would fall within the scope of the claims.

In the drawings:

Fig. 2 is a section taken on line 2—2 of Fig. 1 with the louver operating member removed for clarity.

Fig. 3 is a section taken on line 3—3 of Fig. 2 showing one type of vacuum motor.

Fig. 4 is a side elevation of the thermostatically controlled valve with certain parts shown in cross section showing the relative location of the piston valve when the engine is cold.

Fig. 5 is a view similar to Fig. 4 showing the relative location of the piston valve when the engine is over heated.

Fig. 10 is a view similar to Fig. 3 of a modified type of pressure operated type of motor.

Figure 1:
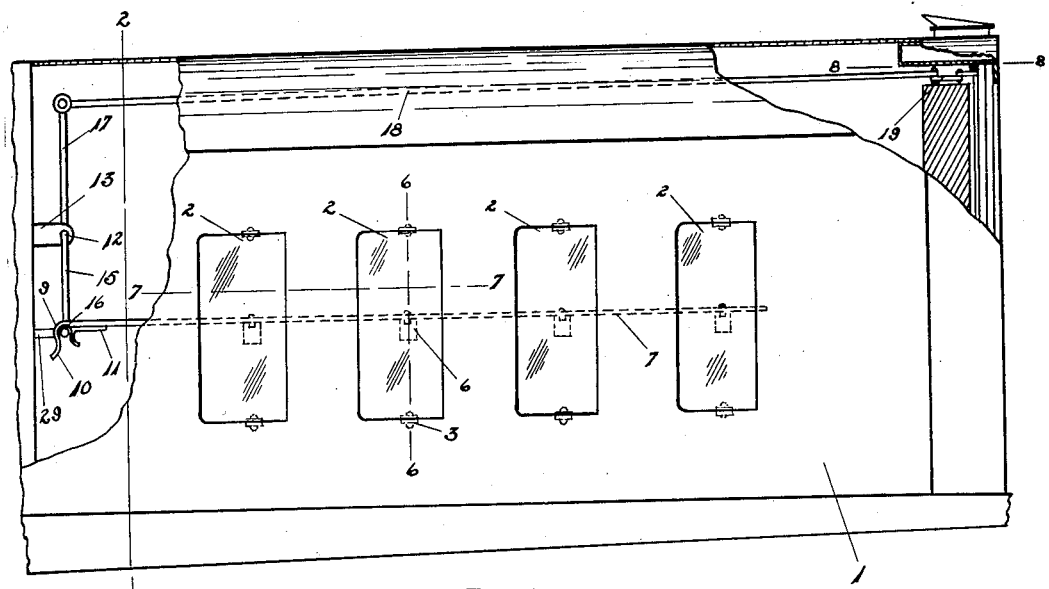
Fig. 1 is a side elevation of the hood and radiator shell of a motor vehicle, parts of which are shown broken.
Figures 6, 8, 9:
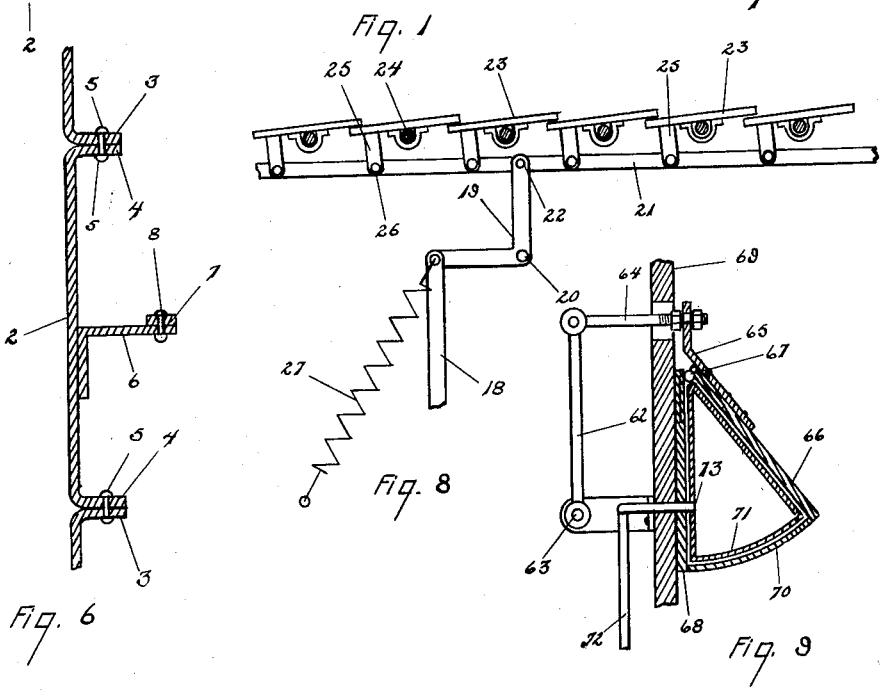
Fig. 6 is a cross sectional view of a louver taken upon line 6—6 of Fig. 1.
Fig. 8 is a cross sectional view of the shutter operating mechanism taken on line 8—8 of Fig. 1.
Fig. 9 is a view similar to Fig. 3 of a modified type of fluid operated motor.
Figure 7:
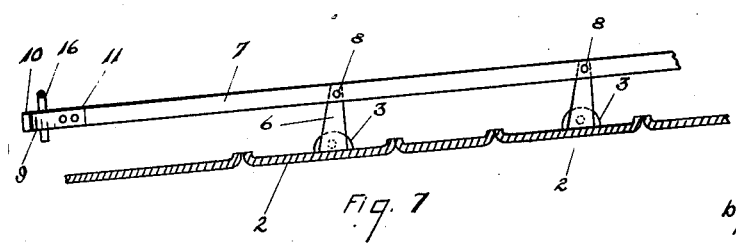
Fig. 7 is a cross sectional view of the hood taken on line 7—7 of Fig. 1.

With reference to the drawings, in Fig. 1 the usual hinged engine hood for motor vehicles is designated by reference character 1 having located therein any well known type of louver, such as designated 2, pivoted in the side of the hood 1. As shown in Figs. 1, 6, and 7, the means for pivoting the louvers 2 consists of a turned back tab portion 3 formed from a side portion of the hood 1 and similar tab portion 4 formed from continuation of the louvers 2. The tabs 3 and 4 are pivotally secured together in any well known manner, for example by rivets 5. As shown in Fig. 1, it is desirable to pivot the louver intermediate its vertical edges in order to reduce the force of air tending to close the louver when the vehicle is driven at high speed.

L-shaped brackets 6 are welded or otherwise secured to the louvers 2 and pivotally support a longitudinally reciprocable member 7 through pivot pins 8. The member 7 is permanently bent at 9 to form a downwardly projecting arm having an elongated cam surface 10. A hooked shape member 11 is fixedly secured to the member 7, co-operating with the cam surface 10 to form a clipping member to be hereinafter described.

As shown in Figs. 1 and 2, a rock shaft 12 extends transversely of the hood and is preferably journaled in L-shaped brackets 13 secured to the dash 14'. For economy of construction, the shaft 12 is bent at 14 to form crank member 15 having horizontally projecting member 16 adapted to be received by the clipping member formed by the elements 10 and 11.

In view of the louver actuating means being entirely mounted upon the side of the hood 1, the side of the hood may be raised and lowered without any manual adjustment of the positive connection between the shaft 12 and the member 7. When the hood is raised the member 16 will pass through the throat between the elements 10 and 11. When the hood is lowered, the member 16 will cam the member 7, through the elements 10 and 11, to the correct adjustment. If desired, the element 11 may be omitted and a spring attached to the member 7 to close the louvers.

A vertical arm 17 is fixedly secured to the rock shaft 12 and has a rigid link 18 pivoted thereto extending forwardly and connected to a bell crank 19. The bell crank 19 is pivoted at 20 and is pivotally connected to the shutter operating member 21 at 22. The shutters 23, of a type known in themselves, are pivoted on rods 24 secured in the radiator shell and have bracket members 25 secured thereto and pivotally secured to the member 21 at 26. It will be obvious that upon the rocking of the bell crank 19 the member 21 will be reciprocated to simultaneously open and close all the shutters 23. A strong spring 27 secured to the tie rod extending between the dash and the radiator is preferably employed to maintain the shutter 23 normally closed. The spring 27 also functions to rock the shaft 12 counter-clockwise, as viewed in Fig. 1, to close the louvers 2.

An arm 28 fixedly secured to the rock shaft 12 has a link 29 pivotally connected thereto at the lower end. The link 29 is threaded at 30 and has opposing rounded face nuts 31 threaded thereon on opposite sides of a strap iron member 32 provided with an aperture to receive the link 29. The member 32 secured by bolts or the like to a pivoted framework 33 and 34 secured to the dash 14' having bellows 35 located therein.

Although this invention is by no means limited to any specific type of motor for rocking the shaft 12, the employment of the bellows 35 constitutes an important feature of this invention. The bellows 35 can be very cheaply manufactured yet be air tight in construction. Furthermore, in view of there being no relatively movable parts in frictional engagement, the power required to operate the bellows 35 is substantially constant throughout its period of use and for this reason periodical adjustment of the thermostatic control mechanism regulating the operation of the bellows to compensate for the varying drag of the motor is eliminated.

A flexible conduit 36, preferably of copper is passed through the dash 14' and opens into the interior of the bellows 35. The conduit 36 extends from the bellows 35 to a region of reduced pressure, preferably the intake manifold 37 of the internal combustion engine diagrammatically shown as 38.

Inserted in the conduit 36 is a thermostatically controlled valve generally designated 39 comprising a cylinder 40 mounted on a cantilever member 41 superimposed upon a strip of thermostatic metal 42 fixedly secured to the top of the engine 38 by a stud bolt 43. Support on the strip 42 and closing fitted in the cylinder 40 is provided a floating piston 44 with a grooved port 45 intermediate the ends. Ports 46 and 47 are provided in the walls of the cylinder 40 and open up into sections of the conduit 36 leading to the bellows 35 and manifold 37, respectively. It is to be noted that the port 46 is substantially wider than the port 47 and extends into the horizontal plane of a bleeder port 48 located in the cylinder 40. A temperature regulating spring 49 is interposed between the top of the piston 44 and an adjustable screw 50 threadedly engaged within the cylinder 40.

Although I have shown the louver operating mechanism in combination with front radiator shutters, I anticipate the employment of my novel louver operating mechanism upon a motor vehicle without radiator shutters or independent thereof.

The operation of the foregoing described mechanism is as follows: Upon the starting of the engine 38 and during the operation thereof below a predetermined temperature, the thermostatic strip 42 will remain in the position shown in Fig. 4 with the piston valve 44 sealing the port 47 leading to manifold 37 and the bleeder port 48 exhausting through the grooved port 45 and the cylinder port 46 into the conduit section leading to the bellows 35. With the bleeder port exhausting in to the bellows 35, the bellow 35 will take the expanded position shown in Fig. 3, thus permitting the spring 27 to close the shutters 23 and louvers 2.

As the temperature of the engine 38 increases, the strip 42 will move upwardly lifting the piston valve 44 and compressing the spring 49, and when at a point predetermined by the adjustment of the screw 40, the port 45 in the piston valve 44 will move into the horizontal plane of the port 47 and the suction in the manifold 37 will be permitted to exhaust the air in the bellows 35 through the conduit 36. As the air is being exhausted from the bellows 35, the atmospheric pressure will tend to collapse the same causing the lower end of the strap member 32 attached to the pivoted bellows frame to move to the right as viewed in Fig. 3 rotating the rock shaft counter-clock-wise. The rocking of the shaft 12 by the collapse of the bellows 35 moves the crank arm to the left as viewed in Fig. 1 carrying with it the portion 16 and the associated elements 7, 10, and 11 with the result that the louvers are moved to an open position. Likewise the arm 17 is moved to the left carrying the link 18 in the same direction to rock the bell crank 19 to open the shutters 23.

In the event, the temperature of the engine 38 continues to increase with the shutters 23 and louvers 2 in full open position, the piston valve 44 will continue to be lifted by the strip 42 until the port 45 of the piston valve passes above the port 47 of the cylinder to seal the conduit leading to the collapsed bellows 35. If at this point the engine 38 should be stopped, the shutters and louvers would remain open until the engine had cooled down to the point at which the port 45 coincides with the port 47 whereupon air will bleed back through the conduit connected with the manifold to break the vacuum in the bellows 35 permitting the spring 27 to close the shutters and louvers and again extend the bellows 35.

In order to provide for the unusual circumstances where the temperature of the engine becomes such as to require the opening of the shutters 23 and louvers 2 and then, with the engine still running and a suction still present in the manifold 37, the temperature of the engine falls below that at which the shutters and louvers are open, the bleeder port 48 is located below the horizontal plane of the narrow port 47 and in the plane of the wider port 46 to permit the piston valve 44 to seal the port 47 and open the bleeder port 48 as the temperature falls to break the vacuum in the bellows 35 to close the shutters and louvers. It will thus be apparent that the vacuum in the bellows 35 is broken by bleeding through the conduit leading to the manifold when the engine is stopped after the engine drops below a predetermined temperature and by bleeding through the port 48 when the engine is still running and the temperature of the engine has likewise dropped below a predetermined point.

In Fig. 10 is shown a modified motor which may be employed to operate the shutters and louvers where it is desired to employ pressure rather than vacuum for an operating medium.

As shown in Fig. 10, reference character 51 designates a rock shaft similar to shaft 12 having fixedly secured thereto an arm 52 operatively connected to a piston 53 by a link 54. The piston 53 is closely-fitted in a cylinder 55 secured to the inside of the dash. The link 54 passes through a packing box 57 presenting a substantially air tight expansion chamber into which a conduit 58 opens at 59. The conduit 58 is connected with a source of air pressure which is diagrammatically represented as 60 and may be a storage tank or an air pump directly driven by the engine of the vehicle.

Inserted in the conduit 58 is a thermostatically controlled valve 61 which may be identical in construction with the valve shown in Figs. 4 and 5 which operates equally as well in a pressure system as in a vacuum system, the only difference in operation residing in the reversal of the flow of operating fluid. The valve shown in Figs. 4 and 5 is especially adapted for pressure system where the pressure is created by a pump driven by the engine and dependent upon the running thereof for the reason that the piston in the valve will seal the conduit leading to the pressure motor when the engine is overheated and thus prevents the louvers and shutters from closing if the engine was stopped under such conditions and the source of pressure rendered inoperative. However, when a storage pressure tank is employed to operate the piston 53, the source of pressure is independent of the running of the engine and there is no need of sealing the conduit leading to the pressure motor and means may be provided to stop the piston of the valve in a position leaving the conduit 58 open continuously after a predetermined increase in temperature.

In Fig. 9 is shown a modified embodiment of the pivoted bellows supporting frame shown in Fig. 3 which permits the advantages of this type of operating motor to be utilized in a pressure system. As shown in Fig. 9, an arm 62 is fixedly secured to a rock shaft 63, similar to the rock shaft 12. A link 64 operatively connects the arm 62 with a strap iron member 65 secured to the frame 66 pivoted at 67 to a frame 68 which is in turn fastened to the inside of the dash 69. Reference character 70 designates a flexible material, preferably detachably secured to the frame members 66 and 68, completing a housing for a pneumatic inner tube member 71 located therein. A conduit 72 is detachable coupled with the tube 71 at 73 in any well known manner. The conduit 72 may be connected with a thermostatically controlled pressure system in a manner shown in Fig. 10 and herebefore described. Through the employment of the inner tube 71 the same may be removed from the housing and patched in the event of a leak or may be replaced at very little expense. The operation of the pressure operated bellows shown in Fig. 9 is similar to the operation of the bellows 35 in Fig. 3 with the exception that the inner tube 71 is expanded to rock the shaft 63 to open the shutters and louvers rather than contracted.

Figure 13:
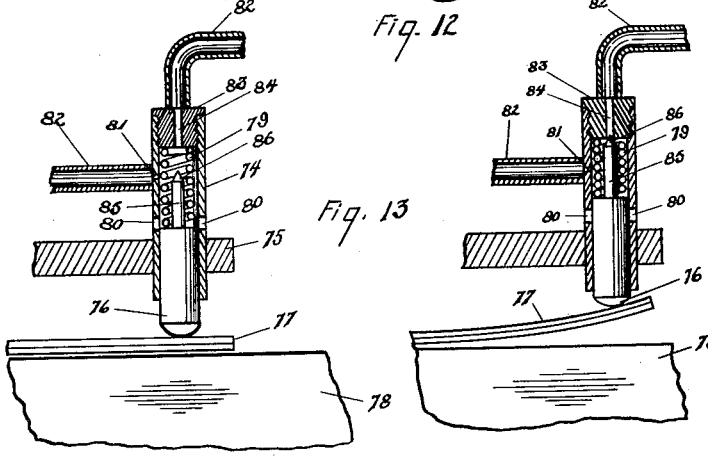
Figs. 13 and 14 are cross sectional views of a modified thermostatically controlled valve shown in open and closed positions respectively.
Figure 14:
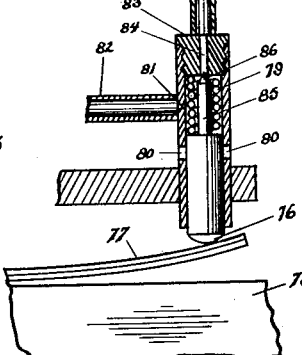

In Figs. 13 and 14 is shown a modified thermostatically controlled valve which does not necessitate in its construction the accuracy in machining, which is necessary in the production of the valve shown in Figs. 4 and 5, in order to produce satisfactory operation, but which does have the limitation of only being adapted for a vacuum system while the valve shown in Figs. 4 and 5 operates equally as well on either vacuum or pressure.

As shown in Figs. 13 and 14 of the drawings, a cylinder 74 is supported by a cantilever 75. A floating piston 76 is slidably received in the cylinder 74 and is resiliently positioned by a spring against a strip of thermostatic metal 77 slightly spaced from the engine block 78 adjacent the piston and in direct contact with the block 78 at the left end (not shown). The cylinder 74 is provided with relatively large ports 80, preferably round in shape, and a relatively small port 81 opening into the section of the conduit leading to a source of reduced pressure, preferably the intake manifold of the engine. In practice, a $\tfrac{1}{32}$-inch port in the cylinder 74 proves sufficient leading to the manifold.

The cylinder 74 is tapped at the upper end and a plug 83, provided with a port 84 opening into the section of the conduit 82 leading to the vacuum motor, is threadedly secured therein. A post 85 secured to the piston 76 and movable therewith is provided with a cone shaped point adapted to be moved into the port 84 by the piston 76 to close the same.

The operation of the above described valve is as follows: When the engine is cool the piston 76 will take a position shown in Fig. 13 with the large ports 80 wide open to the atmosphere. Under this condition the suction in the conduit 82 leading to the manifold will remove only air drawn in through the large ports 80. There is a decided advantage in having the port 81 open to the atmosphere during a large portion of the operation of the engine for the reason that a varying supply of air admitted into the intake manifold has an effect upon the carburetion of the engine. As the temperature of the engine block 78 increases, the piston 76 is raised until the top thereof seals the ports 80. As a result of the employment of a relatively small port 81 leading to the manifold, the cords formed by the upper edge of the piston 76 gradually decreases to close the round ports 80, and a point is reached where the air admitted through the closing ports 80 will not satisfy the suction in the conduit leading to the manifold and a small amount of air is exhausted through the port 84, slightly collapsing the bellows of the motor, to barely open the louvers and shutters. If this results in sufficient ventilation to maintain the engine 78 at that temperature, the piston 76 will remain in this position with the ports 80 slightly opened and a slightly reduced pressure in the bellows. If the temperature of the engine block 78 drops upon the slight opening of the louvers and shutters, the ports 80 will widen and because of the relative size of the ports 80, 81, and 84, the port 84 will bleed through the port 80 to allow the louvers and shutters to close. In the event the temperature of the engine block 78 continues to increase after the louvers and shutters are slightly opened, the piston 76 will continue to rise, completely closing the ports 80, and permitting the air in the bellows to be completely exhausted, gradually and smoothly, through the port 81, to move the louvers and shutters to full open position. If the temperature of the engine continues to increase, the piston 76 will take the position shown in Fig. 14, with the cone 86 sealing the port 84, and the upper end of the piston substantially overlapping the ports 80. If the engine should be stopped when operating at this temperature, the cone 86 will seal the port 84 to prevent bleeding through the port 81 and the bellows are retained in a collapsed state with the louvers and shutters full open. The reduced pressure existing in the port 84 and conduit 82 leading to the bellows assists in retaining the cone 86 in sealing relationship with the port 84 to assure no bleeding therethrough. It will thus be apparent that the sealing of the port 84 will retain the shutters and louvers open, after the engine is stopped until the engine block 78 has cooled sufficiently to permit the spring 79 to break the seal as the tendency for the strip 77 to be deflected upwardly is reduced.

Figure 11:
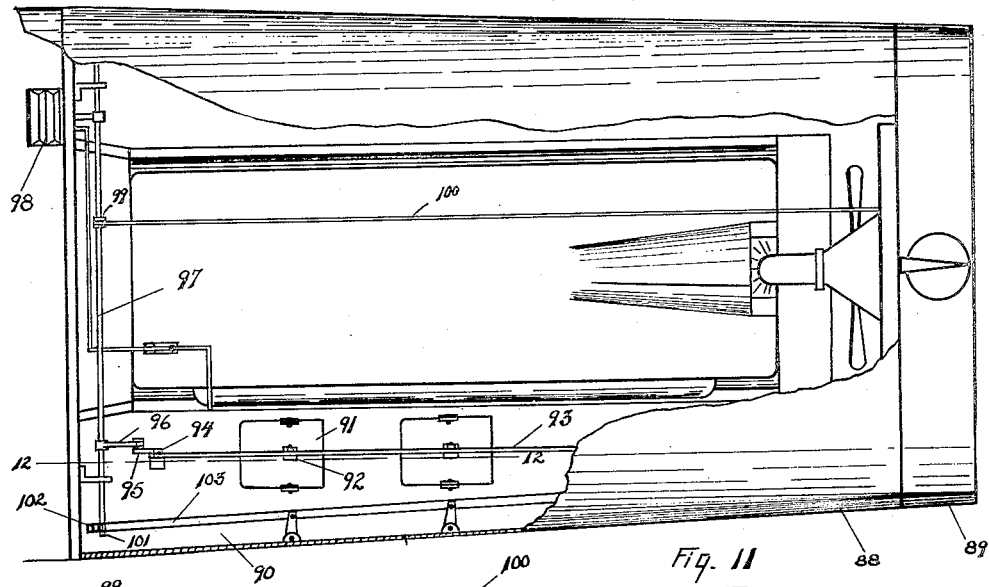
Fig. 11 is a broken plan view of a modified arrangement of ventilating louvers.
Figure 12:
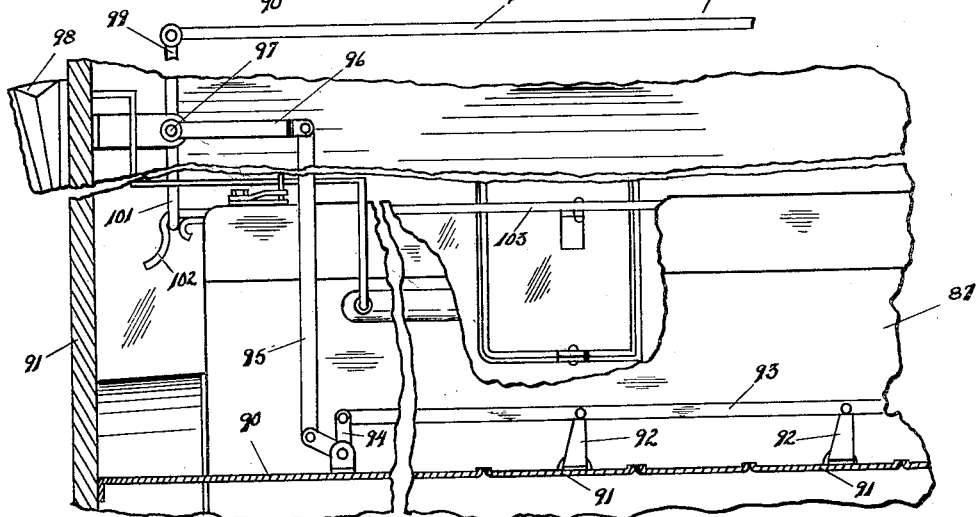
Fig. 12 is a side elevation of the mechanism shown in Fig. 11.

In Figs. 11 and 12, a modified arrangement of ventilation openings is shown in which a vehicle engine 87, in addition to being encased with the usual hinged hood 88 and radiator shell 89, is provided with a mud pan 90 which completely insulates the engine 87 from any upward or downward ventilation, being flush with the dash 91 rather than open as is the usual practice. In addition to the shutters and louvers shown in the embodiment of Fig. 1, louvers 91, which may be identical with the side louvers 2, are arranged in the pan 90 and opened and closed simultaneously through brackets 92 secured to the louvers 91 and pivotally connected to a rod 93 connected to one arm of a bell crank 94 which is in turn connected to a link 95 connected to an arm 96 fixedly connected to a rock shaft 97. The rock shaft 97 is operated through a motor 98 in a manner similar to shaft 12. Although the mud pan louvers are shown in combination with shutter operating members 99 and 100 and side louvers operated through members 101, 102, and 103, all operatively connected with the rock shaft 97, the employment of mud pan louvers alone or in combination with either the side louvers or shutters is anticipated.

It is to be understood that throughout the specification and claims the terms shutter and louver are employed in the broadest sense and for the purpose of clearly setting forth the fact that the ventilation through the casing is controlled at more than one region. Any mechanism regulating ventilation openings in the casing is considered within the scope of my invention.

From the foregoing description, it will become apparent that I have provided a temperature control system for encased engines, especially vehicle engines, which results in a full range thermostatic ventilation control designed to permit the engine to be operated within the range of maximum efficiency. Furthermore, I have provided thermostatically controlled valve and fluid motor structure which is inexpensive in construction yet results in the production of substantially an air tight system.

Having thus described my invention, what I claim as new and desire to protect by Letters Patent is:

1. In a temperature control system, the combination with an engine, of a casing for said engine provided with front and side ventilation openings, means adapted to close said openings, a thermostat directly controlled by the temperature of the engine block, and a motor controlled by said thermostat positively connected with said means whereby the ventilation of said casing is controlled by the temperature of said engine block.

2. In a temperature control system for motor vehicles, the combination with an engine, of a casing for said engine provided with front and side ventilation openings, means adapted to close said openings, a thermostat directly controlled by the temperature of the engine block, and a motor controlled by said thermostat positively connected with said means whereby the ventilation of said casing is controlled by the temperature of said engine block.

3. In a temperature control system for motor vehicles, the combination with an engine, of a casing for said engine provided with front and side ventilation openings, a radiator located in said casing and operatively connected with said engine, means adapted to close said openings, a thermostat directly controlled by the temperature of the engine block, and a motor controlled by said thermostat positively connected with said means whereby the ventilation of said casing is controlled by the temperature of said engine block.

4. In a temperature control system for motor vehicles, the combination with an engine, of a casing for said engine provided with ventilation openings, means adapted to close said openings, a fluid operated motor operatively connected with said means for opening the same, thermostatically regulated means located within said casing and operatively connected with the operating source of said motor, said last means in one position retaining said first means open independent of the operating source of said motor.

5. In a temperature control system for motor vehicles, the combination with an engine, of a casing for said engine provided with ventilation openings, means adapted to close said openings, a fluid operated motor operatively connected with said means for opening the same, a thermostatically regulated valve located within said casing and operatively connected with said motor, said valve in one position retaining said means open independent of the operating source of said motor.

6. In a temperature control system for motor vehicles, the combination with an engine, a casing for said engine including a front shell and a hood, shutters located in said shell, louvers located in said hool, a motor, a thermostat regulated by the temperature of said engine controlling said motor and means connecting said shutters and louvers with said motor.

7. In a temperature control system for motor vehicles, the combination with an engine, a casing for said engine including a front shell and a hood, shutters located in said shell, louvers located in said hood, a motor, a thermostat directly regulated by the temperature of said engine controlling said motor and means connecting said shutters and louvers with said motor.

8. In a temperature control system for motor vehicles, the combination with an engine, a casing for said engine including a front shell and a hood, shutters located in said shell, pivoted louvers located in said hood, a motor, a thermostat regulated by the temperature of said engine and controlling said motor, and means connecting said shutters and louvers with said motor.

9. In a temperature control system, the combination with an engine having a radiator operatively connected thereto, of a casing enclosing said engine and radiator and having side louvers and front radiator shutters, a motor, a thermostat regulated by the temperature of said engine controlling said motor, a rock shaft operated by said motor, and means operatively connecting said louvers and shutters to said shaft.

10. In a temperature control system, the combination with an engine, of a casing enclosing said engine including a hinged hood having side louvers located therein and front radiator shutters, means for opening and closing said louvers and shutters, thermostatically controlled means operatively connected with said means to open and close said louvers and shutters, said louvers operating means being detachably secured to said second means whereby the hood may be raised and lowered without affecting the adjustment of the associated means.

11. In a temperature control system, the combination with an engine, of a casing enclosing said engine including a hinged hood having side louvers located therein and front radiator shutters, means for opening and closing said louvers and shutters, thermostatically controlled means operatively connected with said means to simultaneously open and close said louvers and shutters, said louvers operating means being detachably secured to said second means whereby the hood may be raised and lowered without affecting the adjustment of the associated means.

12. In a temperature control system, the combination with an engine having a radiator, of a casing enclosing said engine and radiator including a hinged hood having side louvers located therein and front radiator shutters, means for opening and closing said louvers and shutters, a motor, a thermostat regulated by the temperature of said engine controlling said motor, means operatively connecting said motor with said first means, said louvers operating means being detachably secured to said second means whereby the hood may be raised and lowered without affecting the adjustment of the associated means.

13. In a temperature control system for motor vehicles, the combination with an engine having a radiator, of a casing enclosing said engine and radiator including a dash board, a hinged hood having side louvers, mud pans having louvers and front radiator shutters, longitudinally reciprocably members operatively secured to said louvers and shutters to open and close the same, a rock shaft mounted on said dash, a motor operatively connected with said shaft, levers fixedly secured to said shaft and operatively connected with said members to move the same simultaneously, a thermostat regulated by the temperature of said engine controlling said motor, said side louvers operating member being detachably secured to its associated operating means whereby the hood may be raised and lowered without affecting the adjustment thereof.

14. In a temperature control system for motor vehicles, the combination with an engine having a radiator, of a casing enclosing said engine and radiator including a dash board, a hinged hood having side louvers and front radiator shutters, longitudinally reciprocably members operatively secured to said louvers and shutters to open and close the same, a rock shaft mounted on said dash, a motor operatively connected with said shaft, levers fixedly secured to said shaft and operatively connected with said members to move the same simultaneously, a thermostat regulated by the temperature of said engine controlling said motor, said side louvers operating member being detachably secured to its associated operating means whereby the hood may be raised and lowered without affecting the adjustment thereof.

15. In a temperature control system for motor vehicles, the combination with an engine having a radiator, a casing enclosing said engine and radiator including a hinged hood having side louvers and front radiator shutters, longitudinally reciprocably means operatively secured to said louvers and shutters to open and close the same, a rock shaft, a motor operatively connected with said shaft, levers fixedly secured to said shaft and operatively connected with said member to move the same simultaneously, a thermostat regulated by the temperature of said engine controlling said motor, said side louvers operating member being detachably secured to its associated operating means whereby the hood may be raised and lowered without affecting the adjustment thereof.

16. The combination with an engine, of a casing enclosing said engine including a hinged hood having side louvers and a dash board, a rock shaft journaled in bearings mounted on said dash board terminating at opposite ends in crank members, longitudinally reciprocable members operatively secured to said louvers to open and close the same, said members terminating at one end in resilient clipping means with elongated cam surfaces adapted to be detachably secured upon said crank members and means connected to said shaft to rock the same.

17. The combination with an engine, of a casing enclosing said engine including a hinged hood having side louvers, a rock shaft terminating at opposite ends in crank members, longitudinally reciprocable members operatively secured to said louvers to open and close the same, said members terminating at one end in resilient clipping means with elongated cam surfaces adapted to be detachably secured upon said crank members and means connected to said shaft to rock the same.

18. The combination with an engine, of a casing enclosing said engine including a hinged hood having side louvers, a rock shaft terminating at opposite ends in crank members, longitudinally reciprocable members operatively secured to said louvers to open and close the same, said members being provided with clipping means with elongated cam surfaces adapted to be detachably secured upon said crank members and means connected to said shaft to rock the same to positively open or close said louvers.

19. The combination with an engine, of a casing enclosing said engine including a hinged hood having side louvers, a rock shaft terminating at opposite ends in crank members, longitudinally reciprocable members operatively secured to said louvers to open and close the same, said members being provided with downwardly extending portions having elongated cam surfaces adapted to detachably cooperate with said crank members to be positively moved in one direction upon the rocking of said shaft.

20. In a temperature control system for motor vehicles, the combination with an engine having a manifold, of a casing for said engine having means closing ventilation openings therethrough, a vacuum motor operatively connected with said means to open the same, conduit connections between said motor and manifold including a thermostatically controlled valve, said valve in one position being adapted to seal the vacuum in said motor whereby said means will not close until the engine has reached a predetermined temperature after the engine is stopped.

21. In a temperature control system for motor vehicles, the combination with an engine having a manifold, of a casing for said engine having means closing ventilation openings therethrough, a vacuum motor operatively connected with said means to open the same, conduit connection between said motor and manifold including a thermostatically controlled valve, said valve being adapted to seal the vacuum in said motor in one position and to break the vacuum in another.

22. In a temperature control system for motor vehicles, the combination with an engine having a manifold, of a casing for said engine having means closing ventilation openings therethrough, a vacuum motor operatively connected with said means to open the same, conduit connections between said motor and manifold including a thermostatically controlled valve capable of a plurality of positions, said valve including means adapted to open said conduit, seal the vacuum in said motor and break the vacuum in said motor, at predetermined temperatures.

23. In a temperature control system for motor vehicles, the combination with an engine having a manifold, of a casing for said engine having means closing ventilation openings therethrough, a vacuum motor operatively connected with said means to open the same, conduit connections between said motor and manifold, a valve inserted in said connections comprising a cylinder having a piston therein, cooperating ports in said cylinder opening into said conduit, a port in said piston intermediate its ends cooperating with said cylinder ports and thermostatically controlled means operative to move said piston to open said conduit on an increase of temperature and to close said conduit on a further increase of temperature.

24. In a temperature control system for motor vehicles, the combination with an engine having a manifold, of a casing for said engine having means closing ventilation openings therethrough, a vacuum motor operatively connected with said means to open the same, conduit connections between said motor and manifold, a valve inserted in said connections comprising a cylinder having a piston therein, cooperating ports in said cylinder opening into said conduit, a port in said piston intermediate its ends cooperating with said cylinder ports, thermostatically controlled means operative to move said piston to open said conduit on an increase of temperature and to close said conduit on a further increase of temperature, and a bleeder port in said cylinder cooperating with said piston port and one of said cylinder ports operative to break the vacuum in said motor upon a decrease in temperature.

25. In a temperature control system for motor vehicles, the combination with an engine, of a casing for said engine having means closing ventilation openings therethrough, a thermostatically controlled fluid operated motor comprising bellows confined within a hinged frame, a rock shaft operatively secured to said frame, and members fixedly secured to said shaft cooperating with said means to open the same.

26. In a temperature control system for motor vehicles, the combination with an engine, of a casing for said engine having means closing ventilation openings therethrough, a thermostatically controlled fluid operated motor comprising bellows confined within a hinged frame, and means operatively secured to said frame and said first means to open the same.

27. In a temperature control system for motor vehicles, the combination with an engine, of a casing for said engine having means closing ventilation openings therethrough, a thermostatically controlled fluid operated motor comprising a collapsible and expandable unit, and means operatively connecting said unit to said means to open the same.

28. In a temperature control system for motor vehicles, the combination with an engine, of a casing for said engine having means closing ventilation openings therethrough, a thermostatically controlled pressure operated motor comprising a collapsible and expandable unit including an inner tube, and means operatively connecting said unit to said means to open the same.

29. In a temperature control system for motor vehicles, the combination with an engine, of a casing for said engine including a mud pan, louvers located in said mud pan and means to operate said louvers to regulate the ventilation within said casing.

30. In a temperature control system for motor vehicles, the combination with an engine, of a casing for said engine including a front shell and a mud pan, shutters located in said shell, louvers located in said pan and means operative to simultaneously open and close said shutters and louvers.

31. In a temperature control system for motor vehicles, the combination with an engine, of a casing for said engine comprising a hinged hood having side louvers and a front radiator shell having shutters, longitudinally reciprocable members operatively secured to said louvers and shutters for opening and closing the same, a transverse rock shaft having downwardly extending crank members operatively and detachably connectable with said louver operating member, a vertical arm secured to said shaft, a bell crank secured to said shutter operating member, a rigid member connecting said arm with said bell crank, resilient means adapted to rock said shaft in one direction and a thermostatically controlled motor operatively connected with said shaft for rocking the same in the opposite direction.

32. In a temperature control system, a fluid operated motor, a source of operating power, a conduit leading from said motor to said source, a cylinder inserted in said conduit having cooperating ports forming a part of said conduit, a floating piston thermostatically controlled received in said cylinder adapted to open and close said conduit, and temperature regulating means operatively connected with said motor.

33. In a temperature control system, a suction operated motor, a source of operating power, a conduit leading from said motor to said source, a cylinder inserted in said conduit having cooperating ports forming a part of said conduit, a bleeder port in said cylinder relatively larger than the ports leading to said source, a piston thermostatically controlled slidable in said cylinder having means adapted to close only the port leading to said motor, said piston in one position opening said bleeder port into communication with both of said cooperating ports, and temperature regulating means operatively connected with said motor.

WILLARD O. TWOMBLY.